Aug. 25, 1959　　　K. GEBELE　　　2,900,885
PHOTOGRAPHIC CAMERA WITH INTERCHANGEABLE SHUTTER
Filed June 9, 1955　　　　　　　　　　　　　5 Sheets-Sheet 1

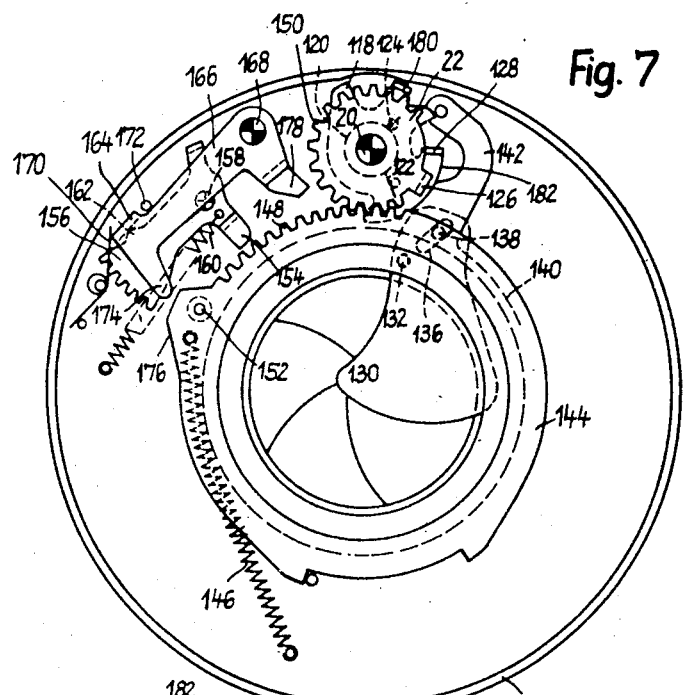
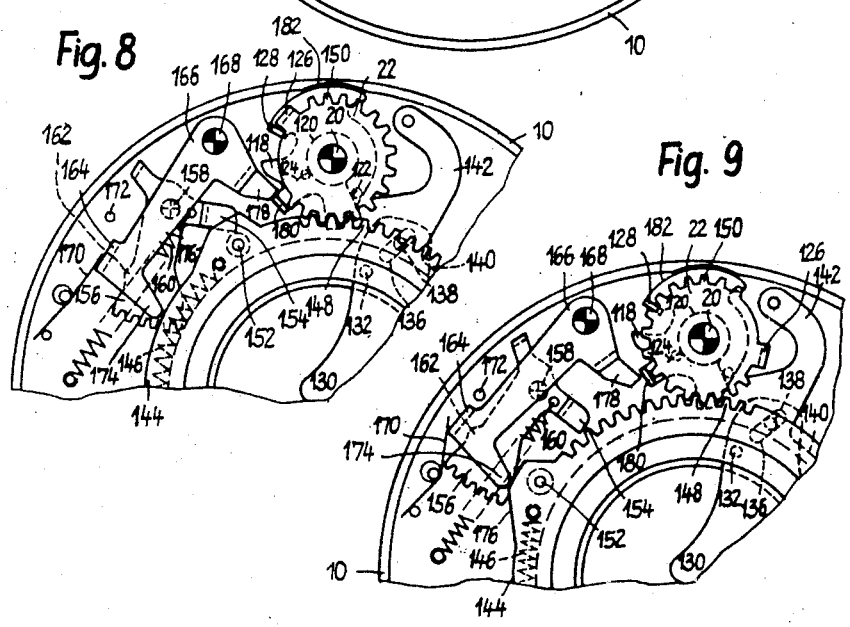

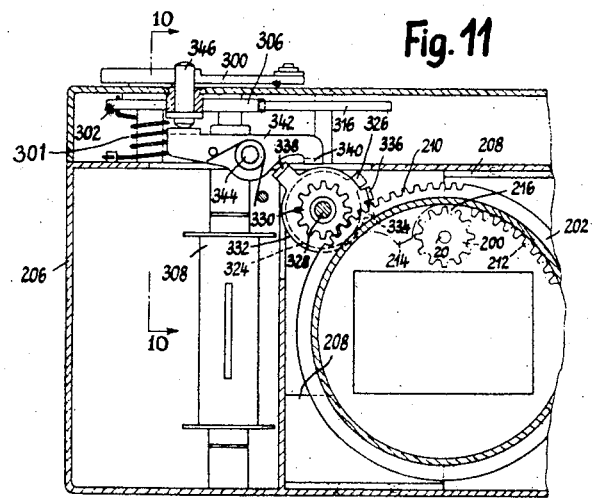

United States Patent Office 2,900,885
Patented Aug. 25, 1959

2,900,885

PHOTOGRAPHIC CAMERA WITH INTER-
CHANGEABLE SHUTTER

Kurt Gebele, Munich, Germany, assignor to Hans Deckel, Munich-Solln, Germany, and Friedrich Wilhelm Deckel, Zug, Switzerland Application June 9, 1955, Serial No. 514,218

Claims priority, application Germany June 11, 1954

18 Claims. (Cl. 95—11)

This invention relates to a photographic camera of the type having an interchangeable shutter, which may be quickly detached from the camera and replaced by another shutter having, for example, a different kind of lens mounted in the shutter.

An object of the invention is the provision of a generally improved and more satisfactory structure of this kind.

Another object is the provision of simple and effective interlocking means between the camera body and the removable shutter, so designed and constructed that the shutter cannot be removed from or placed on the camera body except when the shutter is in a predetermined condition, such as a condition of being cocked or tensioned.

Still another object is the provision of a camera so designed and constructed that the detachable shutter cannot be removed therefrom except when the camera parts are in a suitable position or condition to protect the film from entrance of light when the shutter is removed.

A further object is the provision of simplified and more satisfactory mechanism for interconnecting the movable parts on the camera body with various parts moved thereby on the shutter structure.

A still further object is the provision of a structure in which the shutter will be automatically moved to relaxed or rest position when it is removed from the camera, and will be automatically restored to tensioned or cocked position when it is replaced on the camera.

A still further object is the provision of locking mechanism on the shutter, operated automatically by placing the shutter on or removing it from the camera body, for locking the shutter in a predetermined position or condition, such as a cocked or tensioned condition, to keep the shutter in this condition so long as it remains removed from the camera body.

These and other desirable objects may be attained in the manner disclosed as an illustrative embodiment of the invention in the following description and in the accompanying drawings forming a part hereof, in which:

Fig. 7 is a front face view of a shutter in accordance with the invention, with the front plate removed to show the mechanism beneath, and with various parts omitted, the shutter being shown in rundown or rest position at the conclusion of making an exposure.

Fig. 8 is a view similar to a fragment of Fig. 7, showing the shutter in tensioned or cocked position;

Fig. 9 is a view similar to Fig. 8 showing the shutter parts in the position assumed just after the master member has been released or tripped for making an exposure;

Fig. 11 is a vertical section through the camera body taken transverse to the optical axis approximately on the line 11—11 of Fig. 10, with the parts in run-down or rest position;

Fig. 15 is a view similar to a fragment of Fig. 11 showing in full lines the position assumed when the shutter has been fully cocked or tensioned and is maintained in tensioned position, and showing in broken lines the position of the shutter pinion when the shutter is being detached from or attached to the camera;

Fig. 16 is a view partly in plan and partly in radial section of a control ring shown in Figs. 11 and 15;

Fig. 17 is a view similar to a portion of Figs. 11 and 15, showing the parts in a different position;

The same reference numerals throughout the several views indicate the same parts.

Figure 1:
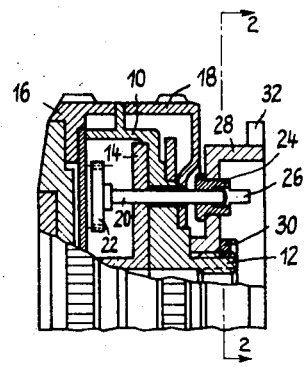
Fig. 1 is a fragmentary view partly in side elevation and partly in radial section, of a shutter in accordance with one embodiment of the present invention, detached from the camera with which it is to be used.

Referring first to the embodiment of the invention shown in Figs. 1 to 5, there is an objective shutter or between-the-lens shutter comprising a main casing 10 of approximately cylindrical form having a rearwardly projecting tubular extension 12 of smaller diameter than the outside diameter of the casing, this extension 12 constituting the rear lens tube and being threaded both internally and externally. A mounting plate 14 within the casing carries the usual forwardly extending or front lens tube. The lens components are mounted in the usual manner within the rear and front lens tubes. The speed or duration of exposure of the shutter is adjustable by rotating an adjusting ring 16 mounted near the front of the shutter and rotatable about the optical axis of the shutter as a center. The diaphragm aperture or stop is adjusted by the rotatable ring 18 similarly mounted near the rear of the shutter for rotation about the optical axis.

The details of the mechanism within the shutter for adjusting the diaphragm aperture and for operating the shutter blades to make an exposure, may be of any suitable known form, such as the form disclosed in applicant's copending U.S. patent application, Serial No. 509,-929, filed May 20, 1955, or approximately the form partially described below in connection with Figs. 7–9. The exact details of such internal construction of the shutter are not important for purposes of the present invention, except that the shutter according to the present invention is to be tensioned or cocked by turning the shaft which extends out through the back of the shutter and which is arranged parallel to the optical axis of the shutter. Such a tensioning or cocking shaft is shown at 20 in Figs. 1, 2, and 4, and may correspond, for example, to the shaft 14 in said copending application, Serial No. 509,929, or to the shaft 20 shown in Figs. 7–9 of the present application. This shaft has fixed to its forward end a gear 22 which, upon rotation of the shaft 20, serves to tension or cock the master member of the shutter and to perform other functions, this gear corresponding, for example, to the member 16 of said copending application, or to the member 22 in Figs. 7–9 of the present application.

The rear end of the shaft 20 extends out through the back wall of the shutter casing, as seen in Fig. 1, and carries a bushing 24 fixed to the shaft, the rear part of the bushing being cut away at two opposite sides so as to leave a diametrically extending tongue or tooth or rib 26 interrupted by the central bore. The parts are so arranged that when the shutter is fully tensioned or cocked, the coupling tooth 26 lies tangential to the optical axis in the position shown in Fig. 2, or edgewise to the vertical plane on which the upper part of Fig. 1 is sectioned. The bushing 24 extends through and is rotatable in the bayonet connection plate 28 which is permanently mounted in fixed position on the rear lens tube 12 of the shutter and is held thereon by means of a threaded clamping ring 30 screwed onto the external threads of the tube 12. The bayonet connection plate 28 has three radially extending wings 32 for cooperation with corresponding bayonet connection retaining means on the front of the camera.

Figure 2:
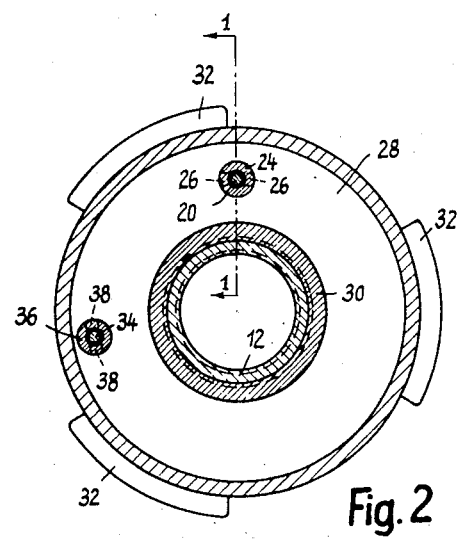
Fig. 2 is a section taken approximately on the line 2—2 of Fig. 1.

The release shaft or trigger shaft 34 (Fig. 2) of the shutter similarly extends out through the back of the shutter housing. The rear end of this release shaft 34 is provided with a bushing 36 similar to the bushing 24, and having a coupling tooth or tongue 38 like the tooth 26, which tooth 38 lies tangential with respect to the optical axis of the shutter (as seen in Fig. 2) when the release shaft is in normal rest position. This release shaft may correspond, for example, to the shaft 95 of the release lever 94 in said copending application, or to the shaft 89 of the latching pawl 92 in said copending application, since proper rotation of either one of these shafts in said copending application will serve to release the shutter for making an exposure.

A shutter of this kind may be used, for example, on a photographic camera of the single lens reflex type, such cameras being well known. When it is desired to use a camera with various different kinds or types of lenses (e.g. an ordinary lens, a wide angle lens, or a telephoto lens) it may be more convenient and quicker to detach the entire shutter and lay it aside, and attach to the camera a different shutter with a different lens mounted therein, than it would be merely to change the lens itself. This detachment and replacement of the entire shutter assembly can be done safely if suitable precautions are taken to avoid entrance of light and fogging the film during the time that the shutter is removed from the camera body, and the present invention provides means for accomplishing this in a simple, satisfactory, and foolproof manner.

In certain kinds of known cameras of the single lens reflex type, the film is protected from access of light whenever the shutter is in tensioned or cocked condition, the light to the film being cut off at this time either by separate blades, or by means of the reflex mirror itself. In these known kinds of reflex cameras, the actuating of the film winding or film transport member serves at the same time to cock or tension the shutter, and also to move the reflex mirror into viewing position, thereby cutting off the light which comes through the now open shutter, so that such light does not reach the sensitized film.

Since the details of such a camera, other than the parts mentioned below, are well known, they need not be specifically disclosed here. It is sufficient for present purposes to say that the front of the camera body is provided with a bayonet connection plate 42 firmly mounted in fixed position on the front of the camera as by means of screws 40, and having circumferentially spaced flanges which are undercut or overhanging as at 44, to mate with and retain the bayonet connection wings 32 and the bayonet connection plate 28 which is mounted on the shutter. By moving the shutter axially toward the front of the camera in proper alinement with the optical axis of the camera and with the wings 32 oriented to aline with the spaces between the overhanging bayonet ledges and the camera body, the bayonet connection plate 28 of the shutter can be brought against the bayonet connection plate 42 of the camera body. The shutter may then be turned in a clockwise direction (when viewed from the front) until the wings 32 pass into and are retained by the bayonet slots 44 on the camera body, the ultimate or final position being determined by contact of one of the wings 32 with the stop pin 54 on the camera body.

Figure 4:
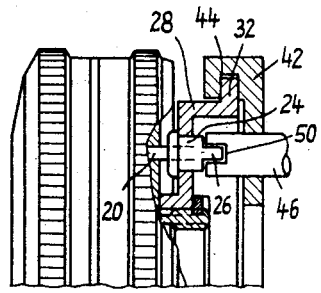
Fig. 4 is a view similar to Fig. 1, but showing the shutter attached to the camera body.

In the camera body there is mounted a shaft 46 rotatable about an axis parallel to the optical axis of the camera and shutter, and extending out through the front of the bayonet connection plate 42, as seen in Fig. 4. The front end of this shaft is provided with a diametrical slot 50 of the size to receive the coupling tooth 26 on the bushing 24, when the slot and the coupling tooth are alined with each other. This shaft 46 is coupled to the film feeding mechanism and other operating mechanism within the camera body, as above mentioned, so as to be turned in one direction (e.g., a counterclockwise direction) during the operation of the film feeding means, and to turn back in the opposite direction (e.g., a clockwise direction) when the shutter is tripped to make an exposure. The parts are so arranged that when the shaft 46 has been turned to tension or cock the shutter, the slot 50 lies tangential to the optical axis of the camera, in the position shown in Fig. 3, and when the parts assume the run-down or rest position at the conclusion of making an exposure, the slot 50 lies at a substantial angle to the tangential position, such as the substantially radial position shown in Fig. 5.

The camera body is also provided with a second shaft 48 which similarly extends forwardly through the bayonet connection plate 42 in a position to cooperate with the release shaft 34 of the shutter, the forward end of this shaft 48 having a diametrical slot 52 which lies tangential with respect to the optical axis of the shutter whenever the shaft is in its normal rest or run-down position at the conclusion of an exposure. This shaft 48 is operatively connected to be turned by any suitable body release plunger or trigger member mounted on the camera body.

Figure 3:
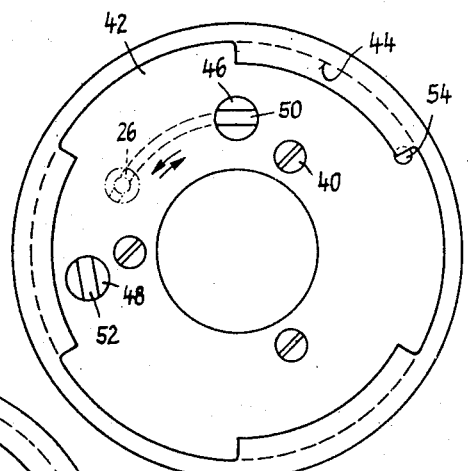
Fig. 3 is a front elevation of part of the camera body with which the shutter of Figs. 1 and 2 is to be used.

When the film winding mechanism of the camera has been actuated following the last previous exposure, so as to swing the reflex mirror to viewing position and to cock the shutter and to move the film-protecting blades to effective protecting position (if the camera employs protecting blades separate from the mirror itself) then the shafts 46 and 48 are in the position shown in Fig. 3, and the shutter can be removed by turning it counterclockwise, since the slots 50 and 52 in the shafts 46 and 48 are tangential, and the tongues 26 and 38 on the shutter can slip circumferentially out of these slots. A different shutter can be mounted on the camera when the shafts are in this position, but only if the shutter is already tensioned or cocked so that the tongue 26 on the shutter will be in its tangentially extending position.

Figure 5:
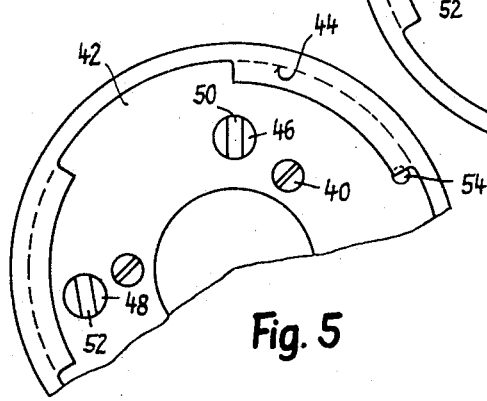
Fig. 5 is a view similar to Fig. 3 with certain operating parts in the camera body in a different position than that shown in Fig. 3.

If the shaft 46 is not in its tensioned or cocked position shown in Fig. 3, but is in the run-down or rest position of Fig. 5, then the shutter cannot be removed because the direction of the slot 50 prevents the shutter from being turned relative to the camera to release the bayonet connection between the two. Also, if it is attempted to attach to the camera a shutter which is in its run-down or rest position rather than in a tensioned position, the shutter cannot be attached because the tongue 26 will not be able to enter the notch 50 regardless of the position in which the shaft 46 may be.

In case the interchangeable shutter is to be used with a camera of some other kind or type, the same principle of a cooperating slot and tongue may be employed to insure that the shutter may be detached from or attached to the camera body only when the parts are in a certain specified condition, although this condition is not necessarily a cocked or tensioned condition in all cases. For example, in case passage of light to the sensitized film is prevented by other protecting means, a cocked or tensioned position of the shutter parts and cooperating camera parts is not necessarily a condition for removal and replacement of the shutter. In such a case the cooperating shafts whose orientation determines the ability or inability to remove the shutter could well be, for example, a shaft in the camera body operatively coupled to a range finder, and a shaft in the shutter operatively coupled to a correspondingly moved part such as a focusing lens mount. The direction of the cooperating tongue 26 and slot 50 (or tongue 38 and slot 52) in any case is such that the shutter can be connected or disconnected only when the cooperating parts on the camera body and shutter are in the predetermined condition or situation which is selected as the prerequisite condition for attachment and detachment.

In the first embodiment of the invention, the operative connection between the control parts on the camera body and the responsive parts of the shutter is provided by means of coaxial shafts (20 and 46, or 34 and 48) clutched to each other by what may be termed a jaw clutch. It is also possible to develop the connection between the control parts on the camera body and the responsive parts of the shutter in a very simple and compact manner, without using a coaxial shaft arrangement, and the shutter may also be operated by means of a single connection to the camera body rather than two separate connections. Such a construction will now be described, referring to the embodiment shown in Figs. 6–17 of the drawings.

First referring to the shutter itself, this is best seen in Figs. 7–9 and except for a few features, it corresponds in general to the shutter disclosed in applicant's said copending application, Serial No. 509,929. As before, the main shutter casing or housing is indicated at 10, and is provided with a tensioning shaft or cocking shaft 20 which extends out through the rear wall of the shutter housing, as in the case of the shutter shown in Fig. 1. A tensioning disk 22 is fixed on the shaft 20 near its forward end. Below or to the rear of the disk 22 there is rotatably mounted on the shaft 20 the main driving member or master member 118 of the shutter, driven by a main driving spring or master spring 120 wound around the shaft 20 and having one end 122 held fast on a fixed part of the shutter casing while the other end 124 is connected to the master member 118. When the tensioning shaft 20 and tensioning disk 22 are turned in a counterclockwise direction (viewed from the front of the shutter as in Figs. 7–9) a rearwardly extending projection or ear 126 on the tensioning disk 22 engages a lug 128 on the master member 118 and turns the master member correspondingly in a counterclockwise direction, winding up or tensioning the spring 120. When the spring becomes fully wound and the master member reaches its fully tensioned position, it is latched in such position by a nose 178 on the latching pawl 166 engaging a lug 180 on the master member, as further mentioned below.

The shutter is provided with any suitable number of blades 130 movable to open and closed positions for making an exposure, each blade being pivoted at 132 to some suitable part of the shutter. Each blade also has a slot 136 engaged by a pin 138 on the blade ring 140 which is rotatable in the shutter housing about the optical axis of the shutter as a center, and which is provided with an arm 142 extending somewhat radially outwardly and carrying two driving pins or projections which cooperate in known manner (the details of which are not important for present purposes) with the master member 118 in such manner that when the master member runs down in a clockwise direction from tensioned position to rest position, it will move the arm 142 and blade ring 140 first in a counterclockwise direction to open the shutter blades 130, and then in a clockwise direction to close the blades again, turning them on their pivots 132.

The shutter casing also contains a control ring 144 rotatable about the optical axis of the shutter as a center and preferably having a bearing support on the front lens tube of the shutter, and lying substantially in the same transverse plane with the tensioning disk 22 on the shaft 20. A spring 146 constantly tends to turn the control ring 144 in a counterclockwise direction. On part of its periphery, the control ring 144 has gear teeth 148 which mesh with corresponding gear teeth 150 on part of the periphery of the tensioning disk 22, so that when the tensioning shaft 20 and disk 22 are turned in a counterclockwise direction to tension the shutter, the gear teeth will drive the control ring 144 in a clockwise direction. In the particular shutter now being described, the parts are maintained in tensioned or cocked position by a suitable latch mounted within the camera body, as explained below, and operatively connected to the shaft 20. This is the principal difference between the internal operating mechanism of the present shutter and that of the closely similar shutter disclosed in said copending application, for in the shutter of said application, the parts are maintained in tensioned position by a latch 92 within the shutter casing, which acts directly on the control ring 76, corresponding to the control ring 144 of the present application.

During the clockwise turning of the control ring 144 from the run-down or rest position shown in Fig. 7, to the tensioned position shown in Fig. 8, a pin 152 on the control ring engages the nose 154 of a toothed sector 156 pivoted in the shutter casing at 158 and provided with a spring 160 which tends to turn the sector in a clockwise direction. The gear teeth on the sector are in engagement with a clockwork escapement mechanism (not shown) of known type, so that the running down motion of the sector in a clockwise direction is retarded by the escapement mechanism.

A projection 162 on the sector 156 may at times press against a lug or ear 164 on a latching pawl or lever 166 pivoted in the casing at 168 and influenced in a counterclockwise direction by a light spring 170 which tends to keep the ear 164 engaged with the part 162. The spring 160 of the gear sector is stronger than the spring 170 of the latching pawl, so that, except when engaged and restrained by other parts, the spring 160 swings the gear sector and carries the latching pawl with it to the end position or rest position determined by the stationary pin stop 172, as seen in Fig. 7.

The latching pawl 166 also has a nose or projection 174 cooperating with an inclined cam surface 176 on the control ring 144, and a latching nose 178 which can drop behind a lug 180 of the master member 118 to hold the same in tensioned position, as already briefly mentioned above.

The master member 118 also carries a projection 182 cooperating with a clockwork escapement mechanism (not shown) which is arranged in the shutter housing in such manner as to regulate the running down time or speed of running down of the master member, thereby to vary the exposure time of the shutter in known manner, the details of which are not important for present purposes. As usual, the retardation time of this escapement mechanism may be adjusted or altered to give exposures of different durations, adjustment being effected by rotating the exposure setting ring or speed adjusting ring 16 shown in Fig. 1.

Figure 6:
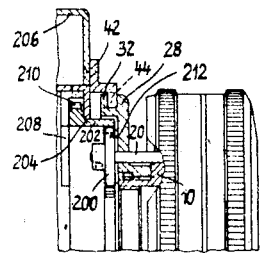
Fig. 6 is a fragmentary view partly in side elevation and partly in longitudinal section, illustrating a shutter and associated camera body according to a second embodiment of the invention.
Figure 10:
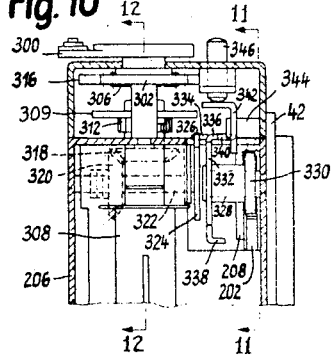
Fig. 10 is a fragmentary vertical section through the body of the same camera shown in Fig. 6, the section being taken along a plane substantially parallel to the optical axis of the shutter and camera, approximately on the line 10—10 of Fig. 11.
Figure 12:
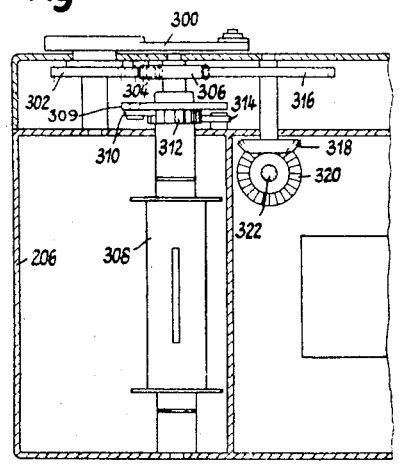
Fig. 12 is a similar section substantially on the line 12—12 of Fig. 10.

A bayonet connection plate 28 (Fig. 6) is secured to the shutter and has bayonet connection ears 32 cooperating with bayonet connection lugs 44 on the bayonet connection plate 42 mounted on the front wall of the camera body 206, as shown in Fig. 6, the construction of the cooperating bayonet connection parts being essentially the same as previously described in connection with Figs. 1–5. A pinion 200 (Figs. 6 and 11) is fixed to the rear end of the shutter shaft 20 in position to mesh with internal gear teeth 212 extending around part of the inner circumference of a short tubular ring gear 202 which is mounted for rotation coaxial with the optical axis in a circular opening 204 in the front wall of the camera body 206, and which serves as the adjustable connecting member or control member on the camera, for controlling both the tensioning of the shutter and the release of the shutter to make an exposure.

This connecting member or control ring 202 is held against axial displacement relative to the camera body by means of two small holding plates 208 secured within the camera body. In addition to the internal gear teeth 212, the ring 202 also carries external gear teeth 210 extending through part of its circumference and meshing with the teeth of a pinion 330 which serves to turn and control the ring for tensioning and release purposes as further explained below. The ring 202 also has an internal locking flange or nose 214 lying in the same plane with the internal teeth 212, but spaced from them in a counterclockwise direction by a gap 216 sufficiently large so that this space can receive the pinion 200 with a reasonable amount of play, as seen in broken lines in Figs. 11 and 15.

This control ring 202 performs several functions. First, it serves to transmit both the tensioning or cocking motion and the release motion from the appropriate control parts within the camera body to the appropriate responsive parts of the objective shutter. Second, it serves to lock the objective shutter to the camera body in such manner that the shutter can be removed from the camera body only when the cooperating parts are in a given condition or situation, e.g., a condition in which the shutter is fully tensioned. Third, it provides for automatic tensioning of the shutter during the motion of placing the shutter on the camera, and for automatic release of the shutter from tensioned position to released or run-down position by the motion of removing the shutter from the camera, so that while the shutter is laid aside and not in use, it remains in run-down or rest condition, yet is automatically tensioned again when it is put back on the camera.

The first of these functions is fulfilled by the ring 202 simply by the fact that it has two toothed portions, one of which is in driven relation to what may be called the camera body mechanism and the other of which is in driving relation to what may be called the shutter mechanism. The second and third functions above mentioned are performed by the control ring 202 in that, due to the locking nose 214, the ring permits removal of the shutter only when the ring is in a certain predetermined position, and due to the gear teeth 212, the rotary motion of the shutter during removal serves to rotate the shutter gear 200 and thereby release the shutter for movement from tensioned position to rest or run-down position.

When the ring 202 is in the rest or run-down position as seen in Fig. 11, the locking nose 214 lies just to the left of the shutter pinion 200 and prevents the shutter from being rotated leftwardly to disengage the bayonet lugs of the shutter from the bayonet lugs on the camera. When the ring 202 has been turned to the tensioned or cocked position shown in Fig. 15, the shutter is tensioned and the locking nose 214 is sufficiently far to the left of the pinion 200 so that the shutter may be turned leftwardly or counterclockwise, to disengage the bayonet lugs and remove the shutter from the camera body. But the mere fact of turning the shutter in a counterclockwise direction to disengage it from the camera, will cause the pinion 200 to travel on the gear teeth 212 so as to turn the shaft 20 in a rightwardly or clockwise direction, thereby causing the shutter to run down to its rest posiiton during the act of removal. Correspondingly, when the shutter is put back on the camera, the rightward motion of the pinion 200 from the broken line position to the full line position shown in Fig. 15, will cause the pinion to be rotated counterclockwise to tension the shutter again by the mere act of installing it on the camera.

Figure 14:
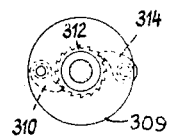
Fig. 14 is a plan of certain film feed driving parts within the camera.
Figure 13:
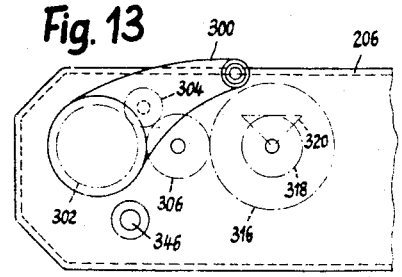
Fig. 13 is a fragmentary plan view of the camera shown in Figs. 6 and 10–12.

The camera body mechanism for operating and controlling the ring 202 will now be described with reference particularly to Figs. 10–17 of the drawings. There is installed at the top of the camera body a film advance lever 300 which is urged clockwise by a light spring 301. When the lever is swung in a counterclockwise direction (when viewed from above as in Fig. 13) it drives a gear train 302, 304, 306 for turning the film winding spool 308 or other suitable film feeding roller. A pawl and ratchet mechanism best seen in Fig. 14 is operatively interposed between the gear 306 of the film feed member 308, this mechanism comprising a disk 309 turning with the gear 306 and carrying a pawl 310 which engages a ratchet 312 on the shaft of the film feed member 308, to turn the member 308 in a counterclockwise or feeding direction when the gear 306 and disk 309 are moved counterclockwise. When the handle 300 is restored to its initial position and the gear 306 moves clockwise, the pawl 310 simply ratchets idly over the ratchet teeth 312, which are then held against reverse motion (to keep the film stretched tightly) by a holding pawl 314 mounted on a fixed part of the camera body.

The film driving gear 306 meshes also with and drives a gear 316, the vertical shaft of which drives a bevel gear 318 meshing with and driving a second bevel gear 320 on a horizontal shaft 322. This shaft 322 lies substantially parallel to the optical axis of the camera and shutter, and is fixed to a driving disk 324 having a radial projection 326. In front of the shaft 322 and coaxial with it is a pivot pin 328 fixed in the camera, on which is rotatably mounted a pinion 330 meshing with the external gear teeth 210 on the control ring 202. A locking disk 332 is fixed to the pinion 330 to turn with it, this disk lying fairly close to the driving disk 324.

The locking disk 332 has a rearwardly bent ear or lug 334 intersecting the plane of the disk 324 in position to be engaged and driven by the driving arm 326 thereof. The disk 332 also carries two forwardly bent ears or lugs 336 and 338, the latter being at a greater radial distance from the pivot 328 than the former. Both of these ears 336 and 338 cooperate under certain conditions with a rearwardly bent ear or lug 340 on the double armed release lever 342 pivoted in the camera body on the pivot 344 and influenced by a light hairpin spring as seen in Fig. 11, tending to turn the release member 342 in a clockwise direction (when viewed from the front as in Fig. 11) to keep the left end thereof in engagement with the lower end of a release plunger 346 which is mounted for limited vertical sliding movement in the top wall of the camera body, and which has its upper end projecting to a position accessible to the finger of the operator.

The operation of these parts is as follows: The rest position of the parts after taking a picture is shown in Fig. 11. If the film feed lever 300 is now turned in a counterclockwise direction (when viewed from above as in Fig. 13) the film will be advanced or transported through the length of one picture frame, any suitable measuring mechanism and stop mechanism (not shown) of known form being employed to determine the exact amount of film which is fed. At the same time, the motion of the lever 300 will drive the shaft 322 and the disk 324 in a clockwise direction, when viewed from the front as in Figs. 11, 12, 15, and 17. The radial driving arm 326 on the disk 324 will engage the rearward ear 334 of the locking disk 332 and will turn this locking disk in a clockwise direction, likewise turning the pinion 330 which is fixed to the locking disk, so as to cause counterclockwise turning of the control ring 202 and corresponding counterclockwise turning of the shutter pinion 200 and its shaft 20, thereby tensioning or cocking the shutter in the manner already mentioned, from the rest position of Fig. 7 to the tensioned position of Fig. 8. In this position, the master member 118 is held in tensioned position by the latching pawl 178 which is free to swing to latching position because the pin 152 engages the tail 154 to swing the sector 156, 162 away from the ear 164 of the latching pawl 178. The shaft 20, disk 22, and control ring 144 are held in tensioned position by the engagement of the pinion 200 with the gear teeth 212.

Upon this tensioning or clockwise rotation of the disks 324 and 332, the ear 336 of the latter comes into engagement with the ear 340 on the release lever 342, swings this release lever slightly in a counterclockwise direction on its pivot 344, and finally drops back of the ear 340 just to the right thereof, in the position shown in Fig. 15. When the operator releases the displacing force on the film feeding arm 300 and the spring 301 restores this arm to its initial or rest position, the shaft 322 and disk 324 turn back to their initial rest positions, but the disk 332 and pinion 330 are held in tensioned or cocked position because of the engagement of the ear 336 on the disk with the ear 340 of the release lever 342.

When the operator is ready to take the picture, he presses downwardly on the plunger or button 346, thus depressing the left end and raising the right end of the release lever 342, so that the ear 336 of the disk 332 can now slip past the ear 340 and the disk 332 and pinion 30 can rotate counterclockwise, with corresponding clockwise rotation of the control ring 202 and clockwise rotation of the shutter pinion 200, shutter shaft 20, and pinion 22, under the influence of the spring 146 acting on the control ring 144 within the shutter. If the operator maintains his finger pressure on the release button 346, this rotation of the parts continues only until the ear 338 on the disk 332 strikes the ear 340 on the release lever, as shown in Fig. 17, and stops rotation of the disk 332 and other parts connected therewith, close to but not quite at the fully run-down position. However, when the operator releases pressure on the button 346 so that the spring of the lever 342 restores the lever to its normal position, then the ear 338 can slip past the lever and the parts will return from their partially run-down position of Fig. 17 to the fully run-down position of Fig. 11. In any event, the first part of the release movement (before the ear 338 is stopped by contact with the ear 340) allows the control ring 144 of the shutter to turn sufficiently far in a counterclockwise direction so that the cam 176 on this control ring engages and raises the nose 174 of the latching pawl 166, thereby releasing the part 178 of the latching pawl from the part 180 of the master member so that the master member can start its running down motion under the influence of the master spring 120, to operate the shutter blades to make an exposure. The position of the parts shown in Fig. 17 will not interfere with successful completion of the exposure, even though the operator delays in taking his finger off of the release button 346.

The use of a control ring 202 as an intermediate connection member between the operative parts in the camera body and the operative parts of the shutter itself, has several advantages, some of which have already been mentioned. Additionally it permits the design of the camera in such a way as to attain any desired spatial relationship between the position of the shaft 20 of the shutter and the position of the shaft 328 of the camera. These two shafts need no longer be in coaxial alinement with each other, as was the case in the first embodiment described in connection with Figs. 1-5. Also, the construction of the ring 202 may be varied as necessary in order to accommodate shutters of varying size, and may be made, for example, longer or shorter in an axial direction. Also, the ring could have, if desired, only a single set of gear teeth engaged both by the shutter pinion 200 and the camera pinion 330, if preferred, instead of two separate sets of teeth. Thus a very compact construction is possible, using the control ring 202 or reasonable variations thereof.

Reverting now to the first embodiment disclosed in connection with Figs. 1-5, a still further simplification of this same basic construction is possible, according to a further aspect of the present invention. It will be remembered that in this first form of the invention, there is a tensioning shaft 20 and a separate release shaft 34, operatively connected to a latch within the shutter which latches the control ring of the shutter (like the control ring 144 in Figs. 7-9) in a manner the same as or similar to the latch 92 operating on the control ring 76 in applicant's said copending application, Serial No. 509,929. But in Figs. 18-24 of the present application, there is shown a construction which satisfactorily holds the shaft 20 against running-down movement without requiring the use of a separate latch within the shutter casing, thus eliminating the need for the second shaft 34 in the shutter and the cooperating second shaft 48 in the camera.

In this embodiment shown in Figs. 18-21, the bushing 24 on the shaft 20 has a connecting tongue 26, just as before. Forwardly from this connecting tongue the bushing is of enlarged diameter, and has a locking notch 458 adapted to be engaged by a corresponding mating part of the relatively stiff leaf spring 456, the left end of which is fixed firmly to the bayonet plate 28 of the shutter.

Figure 19:
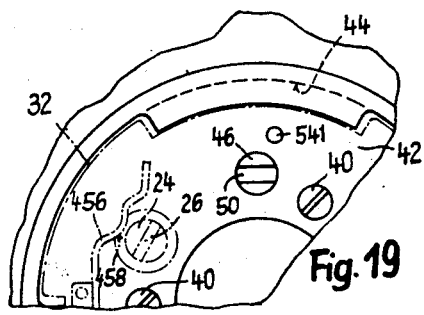
Fig. 19 is a fragmentary front face view of the camera body according to the embodiment shown in Fig. 18, illustrating in broken lines certain parts of the shutter in the position assumed when being attached to or detached from the camera body.
Figure 20:
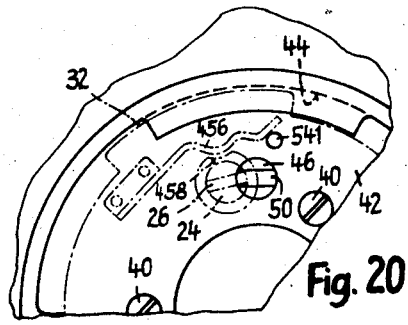
Fig. 20 is a view similar to Fig. 19 with the shutter turned beyond the position shown in Fig. 19, in process of attaching the shutter to the camera body.
Figure 21:
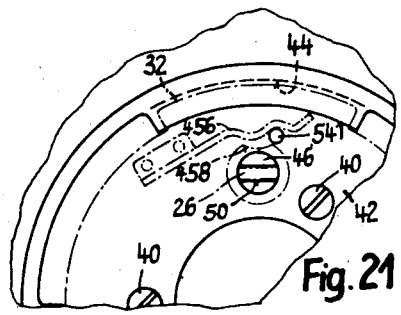
Fig. 21 is a view of the same parts with the shutter fully attached to the camera body.

When the shutter is disconnected from the camera, the spring 456 engages the notch 458 with sufficient force to prevent the bushing 24 and shaft 20 from turning back from tensioned position to rest position. This position of the spring and bushing is shown in Fig. 19. When the shutter is axially alined with the optical axis of the camera and is turned clockwise to engage the bayonet lugs of the shutter with the bayonet lugs of the camera, the advancing or right hand end of the spring 456 comes into contact with a fixed pin 541 on the camera, as seen in Fig. 20, just as the tongue 26 of the shutter shaft 20 enters the notch 50 of the camera shaft 46. Upon continued rotary movement of the shutter in a clockwise direction to the fully engaged position of the bayonet parts as shown in Fig. 21, the spring 345 slides over the fixed pin 541 in such a manner that the spring is fully disengaged from the notch 458 of the shutter bushing 24, leaving the shutter shaft 20 fully under the control of the camera shaft 46 without any resistance from the spring 456. At the same time, a depression or angular notch in the spring 456 engages over the pin 541, serving as a resilient latch tending to prevent accidental counterclockwise disengaging movement of the shutter relative to the camera body.

Upon removal of the shutter from the camera, the parts work in the reverse manner. As already explained in connection with Figs. 1-5, the shutter can be turned counterclockwise to release the bayonet connection only when the notch 50 of the shaft 46 and the tongue 26 of the shaft 20 lie in a tangential relation to the optical axis, which corresponds to the tensioned position of the shutter. As the shutter turns in a counterclockwise direction, starting from the position shown in Fig. 21, the parts assume successively the positions shown in Figs. 20 and 19, and the spring 456 enters the notch 458 to hold the bushing 24 and shaft 20 in tensioned position until the shutter is once more applied to the camera.

Figure 22:
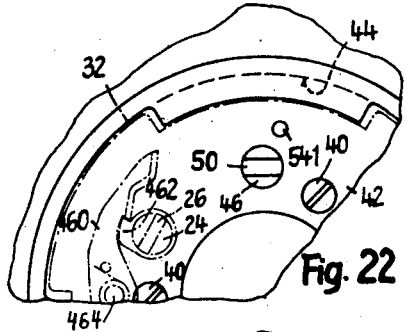
Figs. 22–24 are views respectively similar to Figs. 19–21, showing another embodiment of the invention.
Figure 23:
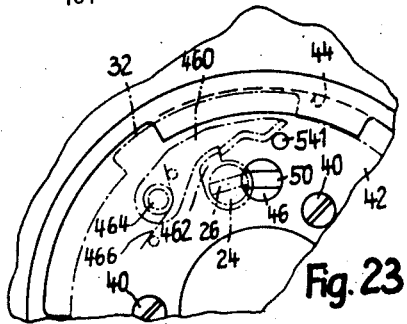
Figure 24:
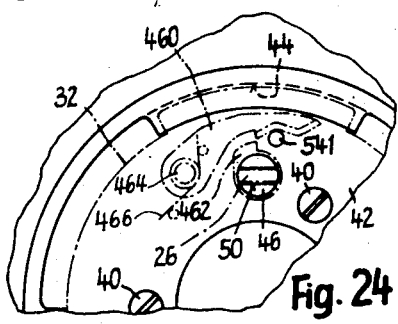
Figure 18:
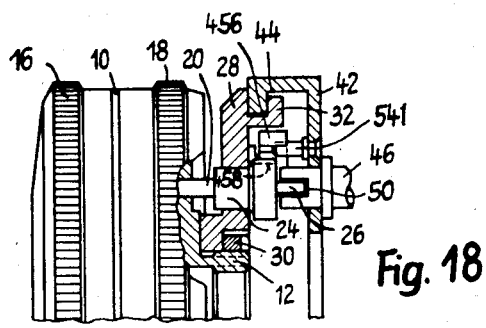
Fig. 18 is a view similar to Fig. 4, showing another embodiment of the invention.

A variation of this structure working in substantially the same way, is illustrated in Figs. 22–24. Here, the shutter shaft is maintained in its tensioned position by a positive latch rather than a resilient one.

A latching arm 460 is pivoted at 464 to the shutter (or to the bayonet connection plate 28 which, for present purposes, may be considered as part of the shutter) and is urged in a clockwise direction on its pivot 464 by a light spring 466. The bushing 24 on the rear end of the shutter shaft 20 has a locking tooth 462 in position to be engaged by a locking shoulder on the lever 460 to hold the shaft in tensioned or cocked position. As in the previous embodiment, the right hand end or advancing end of the latching lever 460 engages a stationary stop pin 541 on the camera body as the shutter is turned successively from the completely disconnected position of Fig. 2 through the partially connected position of Fig. 23 to the completely connected and seated position of Fig. 24, and the coaction of this pin 541 with the lever 460 shifts the lever away from the latching tooth 462 after the tongue 26 of the shutter shaft enters the notch 50 of the camera shaft.

When the parts move in a reverse direction to disconnect the shutter, the stop pin 541 allows the latching lever to drop into latching engagement with the toolth 462, before the tongue 26 is completely removed from the slot 50. Thereby the shutter parts are held in tensioned position so long as the shutter remains disconnected from the camera.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera including a body, a shutter detachably mounted on said body and removable therefrom by predetermined movement relative to said body in one direction and replaceable thereon by predetermined movement in the opposite direction, a member mounted on said body for movement from a first position to a second position for feeding film and for protecting film against access of light notwithstanding opening of the shutter, and means including a portion mounted on said body movable to and from blocking relation to the removal movement of said shutter and controlled by the position of said member for locking said shutter against said predetermined movement of removal from said body when said member is in said first position and for releasing said shutter for removal, if desired, when said member is in said second position.

2. A construction as defined in claim 1, further including means operated by movement of said member from said first position to said second position for tensioning a shutter mounted in operative position on said body.

3. A construction as defined in claim 2, further including latching means for maintaining said shutter in tensioned position when it is removed from said camera body.

4. A construction as defined in claim 2, further including means effective upon removal of a shutter from said camera body for causing said shutter to run down from tensioned condition to rest condition.

5. A construction as defined in claim 2, further including means effective upon installation of an untensioned shutter on said camera body for tensioning said shutter.

6. A construction as defined in claim 5, in which said predetermined movement of said shutter relative to said body is a rotary motion of the shutter relative to the body in one direction for attachment and in the opposite direction for removal, further including means operated by relative rotary movement between the shutter and the body for tensioning the shutter by the act of securing it to the body and for causing the shutter to run down from tensioned condition to rest condition by the act of detaching the shutter from the body.

7. A construction as defined in claim 6, in which said means includes gear teeth on said body arranged arcuately substantially concentric with respect to the center of rotation of the shutter relative to said body, and a gear on said shutter for meshing with said gear teeth to be turned thereby when said shutter is rotated relative to said body to attach it to or detach it from said body.

8. A construction as defined in claim 7, in which said gear teeth are formed on a ring gear mounted on said body for rotation substantially concentric with the optical axis of a shutter attached to the body.

9. A construction as defined in claim 8, further including actuating means on said body to turn said ring gear while a shutter is attached to said body to actuate said shutter.

10. A construction as defined in claim 9, further including a spring within said shutter acting, through said gear, to tend to turn said ring gear in one direction.

11. A construction as defined in claim 9, in which said actuating means on said body serves also to feed film in said body.

12. A photographic camera comprising a body, a shutter attachable to and detachable from said body, said shutter having an operating shaft extending substantially parallel to the optical axis of the shutter, said operating shaft having one rotary position in preparation for making an exposure and a substantially different rotary position at the completion of an exposure, a control shaft mounted on said body and extending substantially parallel to the optical axis of the shutter while the shutter is attached to said body, means operatively connecting said two shafts to each other to turn one of said shafts from the other of said shafts while the shutter is attached to said body, and means operated by turning movement of said control shaft for preventing detachment of said shutter from said body except when said control shaft is turned to a predetermined position.

13. A construction as defined in claim 12, in which said two shafts are coaxial with each other while the shutter is attached to the body, and in which the means connecting the two shafts to each other includes a transversely extending slot associated with one shaft and a transversely extending tongue associated with the other shaft and engaged in said slot.

14. A construction as defined in claim 12, in which said two shafts are arranged with their axes substantially offset laterally from each other, and in which the means connecting the two shafts includes gearing.

15. The combination with a camera body part having bayonet connection lugs mounted in stationary position thereon, of a detachable shutter unit having an optical axis extending centrally therethrough and having bayonet connection lugs for mating engagement with the bayonet connection lugs of the body part by axial movement of said unit toward said body part followed by rotary movement of said unit relative to said body part and for disengagement therefrom by reverse rotary movement of said unit relative to said body part followed by axial movement of said unit away from said body part, said detachable shutter unit including shutter blades, a spring influenced master member movable between a run down position and a tensioned position, means operated by movement of said master member from tensioned position to run down position for opening and closing said blades, and a shaft extending rearwardly from said unit substantially in the direction of axial movement of said unit toward and away from said camera body part, said shaft being operatively connected to said master member to tension said master member upon rotation of said shaft in one direction and having one rotary position when said master member is in tensioned position and a substantially different rotary position when said master member is in run down position, and means mounted on said camera body part and remaining thereon when said shutter unit is detached, for holding said shutter unit against rotary disengaging movement while said shaft is in a predetermined one of its rotary positions.

16. The combination with a camera body part having bayonet connection lugs mounted in stationary position thereon, of a detachable shutter unit having an optical axis extending centrally therethrough and having bayonet connection lugs for mating engagement with the bayonet connection lugs of the body part by axial movement of said unit toward said body part followed by rotary movement of said unit relative to said body part and for disengagement therefrom by reverse rotary movement of said unit relative to said body part followed by axial movement of said unit away from said body part, said detachable shutter unit including shutter blades, a spring influenced master member movable between a run down position and a tensioned position, means operated by movement of said master member from tensioned position to run down position for opening and closing said blades, and a shaft extending rearwardly from said unit substantially in the direction of axial movement of said unit toward and away from said camera body part, said shaft being operatively connected to said master member to tension said master member upon rotation of said shaft in one direction and having one rotary position when said master member is in tensioned position and a substantially different rotary position when said master member is in run down position, and a shaft driving member movably mounted on said camera body part and remaining thereon when said shutter unit is detached, said driving member having means blocking rotary movement of said shutter unit in a disengaging direction so long as said shaft of said shutter unit remains in a predetermined one of its rotary positions.

17. A construction as defined in claim 16, in which said shaft on said detachable unit and said driving member on said body part are operatively connected to each other by tongue and slot means extending in a direction diametrically of said shaft.

18. A construction as defined in claim 16, in which said shaft on said detachable unit has a gear secured thereto, and in which said driving member on said body part is a gear toothed member meshing with said gear on said shaft.

References Cited in the file of this patent

UNITED STATES PATENTS

| | | |
|---|---|---|
| 1,865,078 | Barenyi | June 28, 1932 |
| 2,172,338 | Mihalyi | Sept. 5, 1939 |
| 2,333,820 | Riddell | Nov. 9, 1943 |
| 2,551,085 | Bach | May 1, 1951 |
| 2,620,712 | Clifford | Dec. 9, 1952 |
| 2,785,612 | Singer | Mar. 19, 1957 |

FOREIGN PATENTS

| | | |
|---|---|---|
| 631,201 | Great Britain | Oct. 28, 1949 |
| 473,097 | Italy | July 11, 1952 |